US008626427B2

(12) United States Patent
Park et al.

(10) Patent No.: US 8,626,427 B2
(45) Date of Patent: Jan. 7, 2014

(54) USER INTERFACE METHOD FOR TERMINAL FOR VEHICLE AND APPARATUS THEREOF

(75) Inventors: Hyung-Kil Park, Gyeonggi-do (KR); Chang-Soo Kim, Seoul (KR); Jun-Yong Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/422,235

(22) Filed: Mar. 16, 2012

(65) Prior Publication Data
US 2012/0296561 A1 Nov. 22, 2012

(30) Foreign Application Priority Data

May 16, 2011 (KR) .................. 10-2011-0045568

(51) Int. Cl.
*G06F 19/00* (2011.01)
(52) U.S. Cl.
USPC ............ 701/119; 123/41.12; 123/41.31; 123/41.49; 123/41.64; 165/41; 165/51; 165/122; 165/140; 165/299; 362/548; 362/369; 180/412
(58) Field of Classification Search
USPC ............ 701/119; 123/41.12, 41.31, 41.49, 123/41.64; 165/41, 51, 122, 140, 299, 916; 192/48.92, 50; 362/548, 369; 180/412; 74/650
See application file for complete search history.

(56) References Cited

U.S. PATENT DOCUMENTS

| 5,406,493 | A | * | 4/1995 | Goto et al. ................ 701/462 |
| 6,385,539 | B1 | * | 5/2002 | Wilson et al. ............ 701/468 |
| 7,039,521 | B2 | | 5/2006 | Hortner et al. |
| 7,353,110 | B2 | | 4/2008 | Kim |
| 7,457,705 | B2 | | 11/2008 | Takahashi et al. |
| 8,195,386 | B2 | * | 6/2012 | Hu et al. ................ 701/436 |
| 2005/0192736 | A1 | * | 9/2005 | Sawada et al. ............ 701/117 |
| 2008/0033632 | A1 | | 2/2008 | Lee |
| 2008/0195315 | A1 | * | 8/2008 | Hu et al. ................ 701/212 |

FOREIGN PATENT DOCUMENTS

| KR | 10-2006-0027717 A | 3/2006 |
| KR | 10-2007-0030449 A | 3/2007 |
| KR | 10-2009-0064946 A | 6/2009 |

* cited by examiner

Primary Examiner — McDieunel Marc
(74) Attorney, Agent, or Firm — Cha & Reiter, LLC

(57) ABSTRACT

A user interface method for a terminal for a vehicle is provided. The terminal obtains position information to detect a point of a road. A road image of a driving direction is obtained, a lanes of the road represented on the obtained road image is recognized, and a point of a road and lane in which the vehicle having the terminal arranged therein is detected. A virtual road image regarding the recognized lanes is generated, and the generated virtual lanes are added to the road image of the driving direction of the vehicle, and displayed. Traffic information for each lane and surrounding information (i.e. lane closure, construction, accident, etc.) at the detected point of the relevant road are obtained, and the obtained information is displayed for each virtual lane.

28 Claims, 11 Drawing Sheets

USER INTERFACE METHOD FOR TERMINAL FOR VEHICLE AND APPARATUS THEREOF

CLAIM OF PRIORITY

This application claims the benefit of priority under 35 U.S.C. §119(a) from a Korean patent application filed in the Korean Intellectual Property Office on May 16, 2011 and assigned Serial No. 10-2011-0045568, the entire disclosure of which is hereby incorporated by reference in its entirety.

BACKGROUND OF THE INVENTION

1. Field of the Invention

The present invention relates to a terminal for a vehicle. More particularly, the present invention relates to a user interface method for providing information helpful to an operator while driving a vehicle and an apparatus thereof.

2. Description of the Related Art

An automobile in many parts of the world has become a primary movement means of a modern society. However, it is well known that an automobile traffic accident can endanger lives of a driver and a fellow passengers, and way to reduce the amount of automobile accidents is sought by traffic experts, safety experts, and insurance companies.

Recently, various terminals for a vehicle have been developed to assist with driving, and example of such a terminal is a navigation terminal. The navigation terminal provides information of a path and directions for the fastest route to drive, and even informs the driver when to turn, etc. Furthermore, a vehicle has various equipment for safe driving, such as, for example, a rear camera allowing a user to view the back of the vehicle when pulling out of a parking spot, a distance sensor informing a distance between cars to assist in a safe park, etc.

With regard to the navigation terminal, typically, such navigation terminals provide only a path from a departure to a destination and does not provide traffic information for regarding potential hazards on the roadway. As there is a danger of a traffic accident caused by a car in front, back or to either side of the vehicle always exists, an alternative method for providing traffic information for each surrounding vehicle is needed.

SUMMARY OF THE INVENTION

An exemplary aspect of the present invention provides a user interface method for assisting a user to drive safely and an apparatus thereof for driving a vehicle.

Another exemplary aspect of the present invention is to provide a user interface method for providing information helpful to driving a vehicle, and an apparatus thereof.

Still another exemplary aspect of the present invention is to provide a user interface method for providing traffic information for each road and surrounding information and an apparatus thereof for driving a vehicle.

Yet another exemplary aspect of the present invention is to provide a user interface method for providing traffic information and surrounding information of a roadway to be changed with priority in case of changing the carriageway in driving a vehicle, and an apparatus thereof.

Further yet another exemplary aspect of the present invention is to provide a user interface method for inducing a user's safe driving by additionally showing traffic information and surrounding information for each roadway and the surrounding lanes by providing an image that shows an actual road, and an apparatus thereof.

Other exemplary aspects, advantages and salient features of the presently claimed invention will become apparent a person of ordinary skill in the art from the following detailed description, which, taken in conjunction with the annexed drawings, discloses exemplary embodiments of the invention.

In accordance with an exemplary aspect of the present invention, a user interface method for a terminal for a vehicle comprises obtaining position information to detect a point of a road, obtaining a road image of a driving direction, recognizing a road represented on the obtained road image, and detecting a point of a road, generating a virtual road regarding the recognized road, adding the generated virtual road to the road image of the driving direction, and displaying the same, and obtaining traffic information for each road and surrounding information at the detected point of the relevant road, and informing an operator or passenger of the vehicle with the obtained information for each virtual road.

In accordance with another exemplary aspect of the present invention, an apparatus for a terminal for a vehicle comprises an output unit that outputs image data and voice data, a position information receiver that obtains position information, a rear camera that captures a road image of a driving direction, a traffic information receiver that receives traffic information for each road via at least one network, a vehicle sensor receiver that communicates with a vehicle via a wired line or wirelessly, and obtains surrounding information for each road from the vehicle, a storage that stores a predetermined program for controlling an overall operation, and various data input/output when a control operation is performed, and a controller that performs an overall control; wherein the controller recognizes a road from the road image of the driving direction, detects a road in which the terminal is positioned, generates a virtual road for the recognized road and adds the generated virtual road to the road image of the driving direction and displays the same, detects a point of a road from the position information, and displays traffic information and surrounding information for each road at the detected point of the relevant road for each virtual road.

A vehicle having a user interface apparatus according to the present invention is provided wherein the apparatus comprises an output unit for outputting image data and voice data, a position information receiver for obtaining position information, a rear camera for capturing a road image of a driving direction, a traffic information receiver for receiving traffic information for each road being traveled via at least one network, a vehicle sensor receiver for communicating with a vehicle via a wired line or wirelessly, and obtaining surrounding information for each road from the vehicle, a storage for storing a predetermined program for controlling an overall operation, and various data input/output when a control operation is performed, and a controller for performing an overall control, wherein the controller recognizes a road from the road image of the driving direction, detects a road in which the terminal is positioned, generates a virtual road for the recognized road and adds the generated virtual road to the road image of the driving direction and displays the same, detects a point of a road from the position information, and displays traffic information and surrounding information for each road at the detected point of the relevant road for each virtual road.

BRIEF DESCRIPTION OF THE DRAWINGS

The above and other exemplary aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist a person of ordinary skill in the art with a comprehensive understanding of exemplary embodiments of the User Interface Method for a Terminal For a Vehicle and Apparatus thereof as defined by the claims and their equivalents. The description contains various specific details to assist the person of ordinary skill in the art with that understanding but these details are to be regarded as merely exemplary and illustrative. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for clarity and conciseness when their inclusion may obscure appreciation of the present invention with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustrative purposes only and not for the purpose of limiting the invention as defined by the appended claims and their equivalents.

Figure 1:
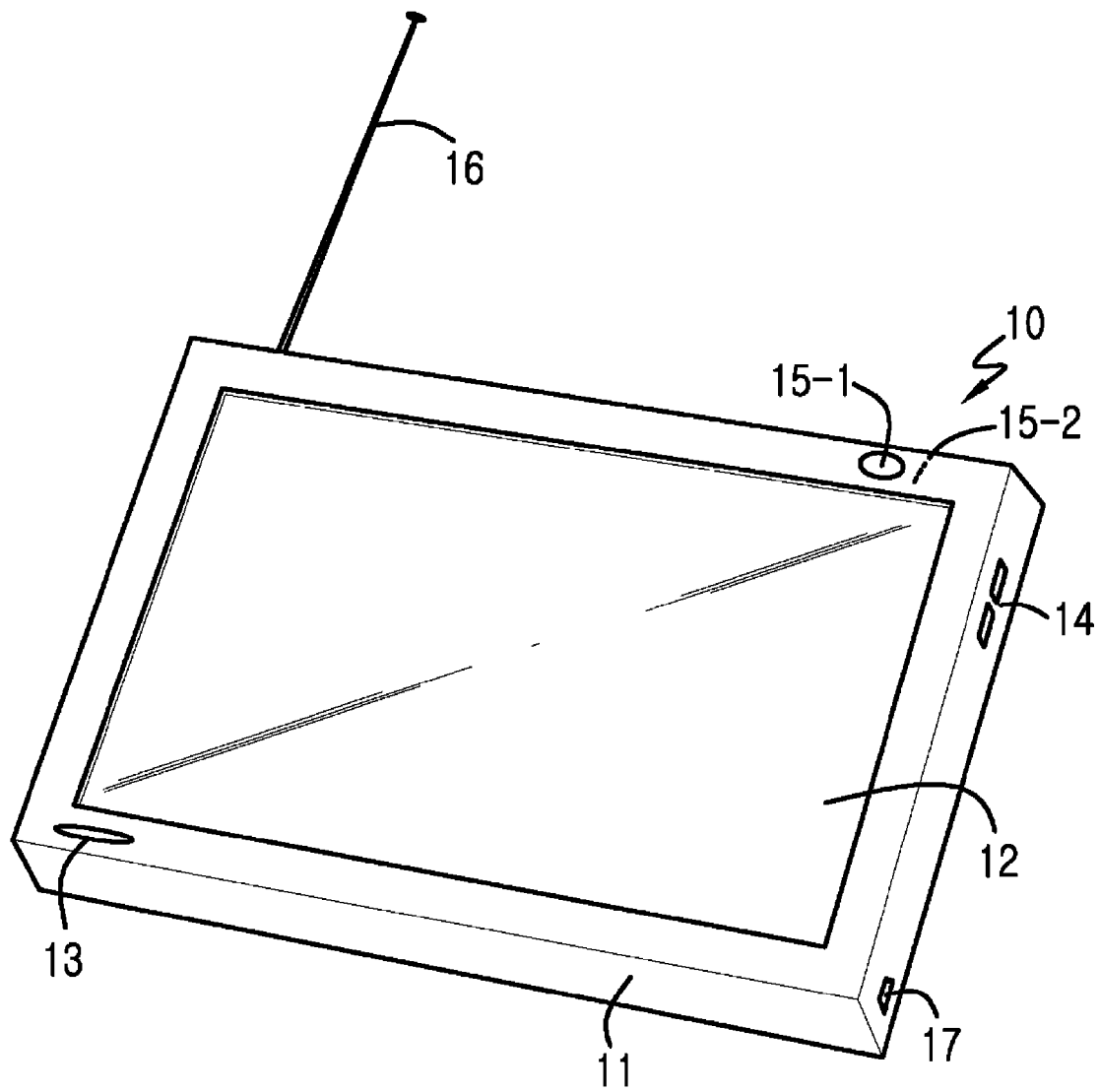
FIG. 1 is a perspective view illustrating a terminal for a vehicle according to an exemplary embodiment of the present invention.

FIG. 1 is a perspective view illustrating a terminal for a vehicle according to an exemplary embodiment of the present invention.

Referring now to FIG. 1, the terminal 10 for a vehicle includes a case frame 11 forming an appearance and the following elements inserted into the case frame 11. The terminal 10 for a vehicle preferably includes a display 12 for displaying image data, a speaker 13 for outputting voice data, a button 14 for input, a front camera 15-1 for image capturing, a rear camera 15-2 (not shown), an antenna 16 required for transmitting/receiving a Radio Frequency (RF) signal, and an external connector 17 for electrically connecting with an external device to communicate with the same. When a touch panel is added to the display 12, a touch screen may be provided. The terminal 10 for a vehicle has a sensor, included but not limited to a Global Positioning System (GPS) sensor to detect a position and a movement velocity. Furthermore, the terminal 10 for a vehicle provides a driving path to a destination using a stored map, and provides traffic information regarding the driving path in the form of an image or voice. The traffic information regarding driving may be received via various networks.

More particularly, the terminal 10 for a vehicle according to an exemplary embodiment of the present invention detects a point of a road corresponding to the position of the terminal 10 itself using the GPS sensor. In addition, the terminal 10 obtains a road image of a front direction of the vehicle, that is, the driving direction via the rear camera 15-2, and recognizes a road represented on the obtained road image to detect a road on which the terminal 10 itself is positioned. The terminal 10 generates a virtual road regarding the recognized road and adds the virtual road to the image of the front direction of the vehicle. Furthermore, the terminal 10 obtains traffic information for each road at the detected point of the road and informs the traffic information for each virtual road to assist the user in visualizes the surrounding environment and possible risk. Furthermore, the terminal 10 for a vehicle according to an exemplary embodiment of the present invention may communicate with a vehicle and receive sensor information and vehicle operation information from the vehicle to inform the information for each virtual road. The sensor information provided by the vehicle may be information detected by a distance sensor. The distance sensor detects a distance the vehicle is from an obstacle. The obstacle can be fixed or in motion. The vehicle operation information provided by the vehicle may be information regarding a vehicle operation such as flickering of left/right directional light, steering operation of a steering wheel, on/off of a break, etc. Furthermore, the terminal 10 may track a user's eyes viewing a screen using the front camera 15-1. As described later, only a relevant virtual road and corresponding information may be provided depending on flickering of the left/right directional light or steering direction of the steering wheel, and the user's eyes.

Figure 2A:
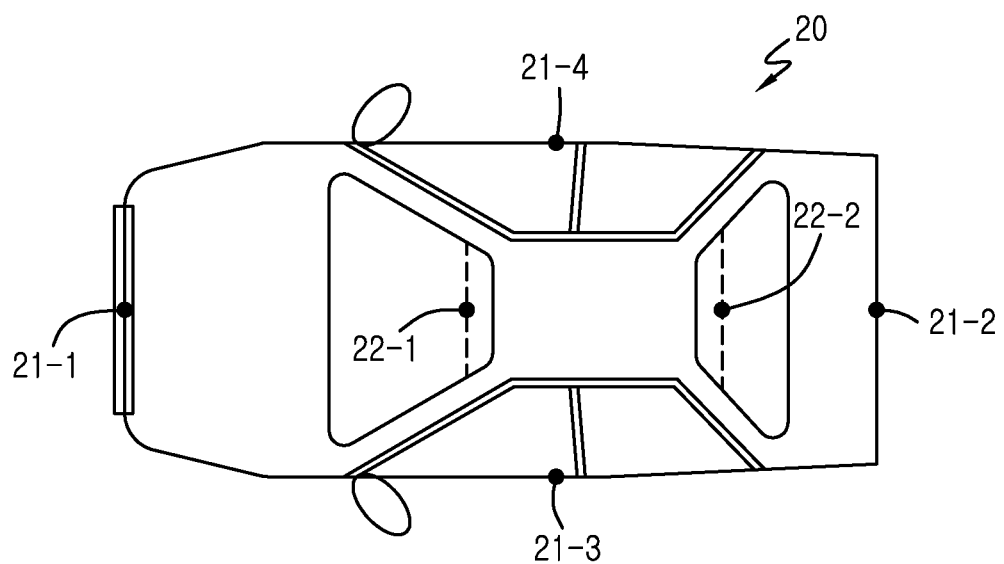
FIG. 2A is a view illustrating that a camera and a sensor are configured in a vehicle according to an exemplary embodiment of the present invention.

FIG. 2A is a view illustrating a camera and a sensor are configured in a vehicle according to an exemplary embodiment of the present invention. Referring now to FIG. 2A, a vehicle according to an exemplary embodiment of the present invention includes one or more distance sensors 21-1, 21-2, 22-1, and 22-2 provided to the front, the rear, and the sides of the vehicle. The distance sensor detects a distance up to an obstacle. The distance sensor comprise an ultrasonic sensor or an infrared sensor.

Figure 2B:
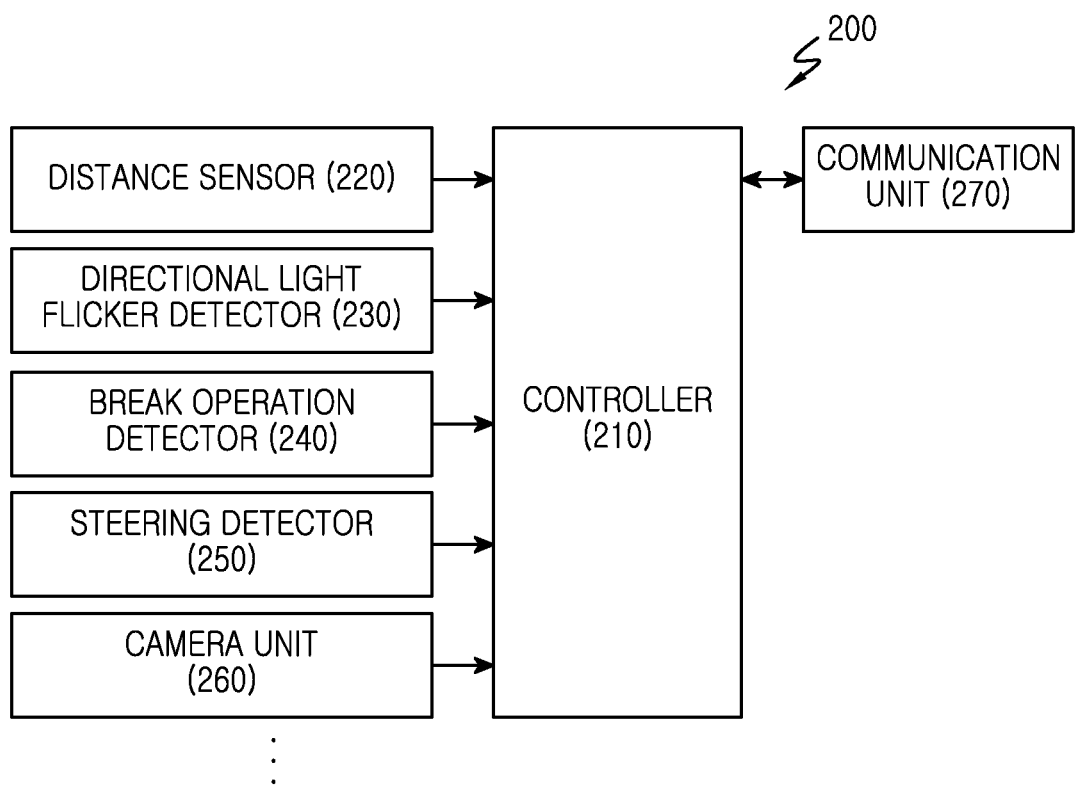
FIG. 2B is a block diagram illustrating an apparatus for obtaining sensor information and vehicle operation information in a vehicle according to an exemplary embodiment of the present invention.

FIG. 2B is a block diagram illustrating an apparatus for obtaining sensor information and vehicle operation information in a vehicle according to an exemplary embodiment of the present invention.

Referring now to FIG. 2B, the apparatus preferably includes a controller 210 for performing a control of an overall operation, and a communication unit 270 for communicating with the terminal 10 for a vehicle. The elements for providing information to the controller 210 may include a distance sensor 220, a directional light flicker detector 230, a break operation detector 240, a steering detector 250, a camera unit 260, etc. The distance sensor 220, which can use optical or ultrasound, for example, detects a distance up to an object (for example, a counterpart vehicle) in the front, the rear, or the sideway, separated from the vehicle, and informs the controller 210 of the distance. The directional light flicker detector 230 detects flickering of a left directional light or a right directional light and informs the controller 210 of the detected flickering. The break operation detector 240 detects that a break operates and informs the controller 210 of the detected operation. The steering detector 250 detects steering of the steering wheel and informs the controller 210 of the detected steering. The camera unit 260 obtains an image of the front of the vehicle or an image of the rear of the vehicle and provides the obtained image to the controller 210. The controller 210, which comprises a processor or microprocessor, transmits information provided from respective elements to the terminal for a vehicle via the communication unit 280. The controller may be configured for communicating with "on-board" systems that are included in some newly built vehicles, and the present invention can replace or augment such systems.

Figure 3:
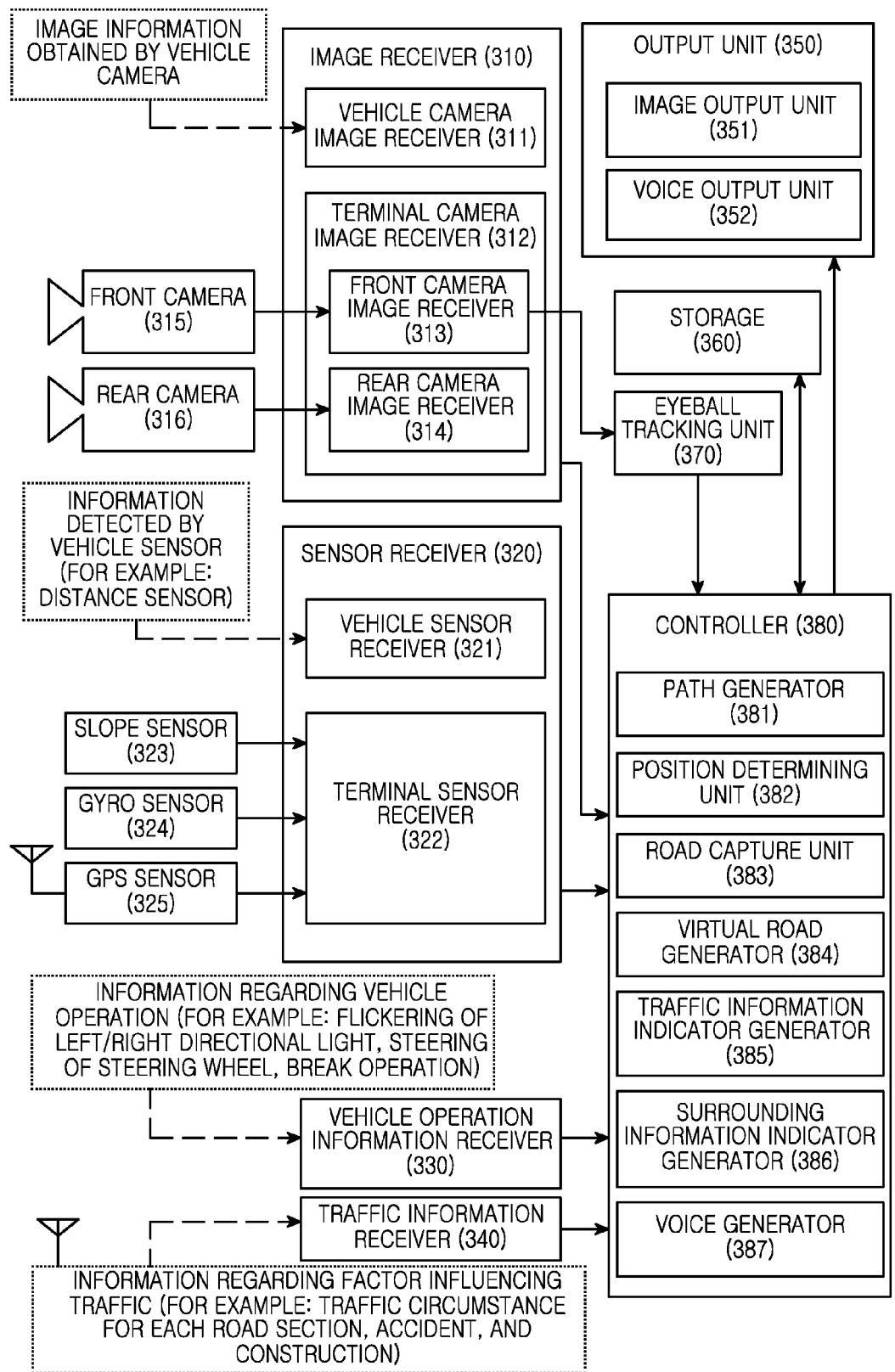
FIG. 3 is a block diagram illustrating a terminal for a vehicle according to an exemplary embodiment of the present invention.

FIG. 3 is a block diagram illustrating a terminal for a vehicle according to an exemplary embodiment of the present invention.

Referring now to FIG. 3, the terminal for a vehicle preferably includes an image receiver 310, a sensor receiver 320, a vehicle operation information receiver 330, a traffic information receiver 340, an output unit 350, a storage unit 360, an eyeball tracking unit 370, and a controller 380. These components may be further separated or further integrated than the exemplary layout shown in the drawings. The image receiver 310 receives image information and preferably includes a vehicle camera image receiver 311 and a terminal camera image receiver 312. The vehicle camera image receiver 311 receives image information captured by a camera provided to the vehicle from the vehicle. The terminal camera image receiver 312 receives image information captured by cameras provided to the terminal. The terminal camera image receiver 312 includes a front camera image receiver 313 for obtaining image information captured by a front camera 315, and a rear camera image receiver 314 for obtaining image information captured by a rear camera 316. The rear camera 316 keeps "eyes" on the front of a vehicle, that is, a road of the driving direction.

A person of ordinary skill in the art viewing the terminal in FIG. 1 will appreciate that camera 15-1 is positioned similarly to front camera 315 and camera 15-2 is positioned similarly to rear camera 316. In other words, the "rear camera" is in the rear of the terminal 10, and when in the vehicle, would capture in its intended position, would capture images in front of the vehicle, whereas front camera 315 would capture images of the driver or rear of the vehicle. Thus, if the terminal is positioned, for example, on the top of the dashboard, the rear camera 316 would obtain images of the front of the road, similar to rear camera 15-2 (shown in FIG. 1) which is actually located in the back of the terminal 10, which is why it is not shown and represented by dashed lines. The front camera 315 observes a driver's view of a vehicle, and could be positioned, for example, similar to front camera 15-1 shown in FIG. 1, at least in terms of front versus rear.

The sensor receiver 320 receives information detected by various sensors, and includes a vehicle sensor receiver 321 and a terminal sensor receiver 322. The vehicle sensor receiver 321 receives information detected by a sensor (for example, a distance sensor) provided to the vehicle from the vehicle. The terminal sensor receiver 322 obtains information detected by sensors provided to the terminal. Known sensors provided to the terminal may be an acceleration sensor 323, a gyro sensor 324, a GPS sensor 326, etc. More particularly, position information provided from the GPS sensor 326 is used for detecting a point of a road corresponding to the position of the terminal, and thus, the position of the vehicle.

The vehicle operation information receiver 330 communicates with a vehicle wirelessly or via a wired line, and receives information regarding a vehicle operation from the vehicle. The vehicle operation may be flickering of left/right directional light, steering of a steering wheel, on/off of a break, etc.

The traffic information receiver 340 receives information regarding a factor having an influence on traffic at the point of the road detected using the position information via at least one network. More particularly, the traffic information receiver 340 may receive traffic information for each road, including the road currently being traveled on and adjacent roads or roads that recommended by navigation to arrive at one's desired destination. The factor having an influence on the traffic may be a traffic circumstance for each road section, an accident, a construction, etc.

The output unit 350 preferably includes an image output unit 351, typically a display) for outputting image data and a voice output unit 352 for outputting voice data.

The storage 360 stores map data for providing a recommended path for travel, a predetermined program for controlling an overall operation, and various data input/output when a control operation is performed.

The eyeball tracking unit 370 tracks a user's eye(s) while viewing a screen from an image provided from the front camera image receiver 313 of the image receiver 310, and informs the controller 380 of the position of the user's eye(s) being tracked.

The controller 380, which comprises a processor or microprocessor configured to control an overall operation of the terminal, and includes a path generator 381, a road capture unit 382, a virtual road generator 383, a traffic information indicator generator 384, a surrounding information indicator generator 385, and a voice generator 386.

The path generator 381 generates a path from map data of the storage 360 and outputs the generated path to the output unit 350.

With continued reference to FIG. 3, the position determining unit 382 receives position information from the terminal sensor receiver 322 to detect a point of a road corresponding to the position information.

The road capture unit 383 recognizes a road represented on a road image of the front of a vehicle provided from the rear camera image receiver 314, and detects a road as well as the particular lane corresponding to the position of the vehicle having the terminal. The road capture unit 383 may recognize a road and identify the lane by analyzing a road image of the front of the vehicle via an image analysis method such as an intelligence analysis method, a two dimensional binary method, etc.

The virtual road generator 384 generates a virtual image of a road with traffic lanes for a road recognized by the carriage capture unit 383, and adds the virtual image of the road to the image displayed of the front of the vehicle afterward being output to the image output unit 352.

The traffic information indicator generator 385 receives traffic information for each road obtained by the traffic information receiver 340 with respect to a point of a relevant road detected by the position determining unit 382, and loads an indicator for informing the user of traffic information for each virtual road from the storage 360.

After that, the traffic information indicator generator 385 outputs a relevant indictor for each lane of the virtual road via the image output unit 352. Furthermore, the traffic information indicator generator 385 may represent a degree of swift driving (i.e. speed) using visually distinctive characteristics (i.e. different colors, brightness, size, highlighting, etc.) of a virtual road based on the traffic information for each road and surrounding information. The surrounding information is subsequently described herein. For example, a virtual road allowing relatively high speeds may be represented using a blue color, and a virtual road requiring relatively slower driving may be represented using a red color.

The surrounding information indicator generator 386 determines surrounding information from information sensed by vehicle sensors obtained by the sensor receiver 320 and information sensed by sensors inside the terminal, and generates/loads an indicator for representing the determined surrounding information from the storage 360. The surrounding information may include a distance up to a front vehicle, a distance up to a vehicle in the sideway, etc. After that, the surrounding information indicator generator 386 outputs a relevant indicator for each virtual road via the image output unit 352. For example, an indicator representing a distance up to a front vehicle is displayed on a virtual road and/or a lane on which the vehicle is positioned, and an indicator representing a distance up to a vehicle in the sideway is displayed on a side virtual road.

The voice generator 387 loads voice regarding the traffic information and the surrounding information from the storage 360, and outputs the voice to the voice output unit 352.

More particularly, the controller 380 may control the elements to inform a relevant virtual carriageway, corresponding traffic information, and corresponding surrounding information depending on a user's eyes detected by the eyeball tracking unit 370 among a plurality of virtual roads. For example, when the user views a left road on a road image of the front of a vehicle, a virtual road for the left road, corresponding traffic information, and corresponding surrounding information are displayed.

Furthermore, the controller 380 may control the elements to inform a relevant virtual road, corresponding traffic information, and corresponding surrounding information depending on information provided by the vehicle operation information receiver 330 among a plurality of virtual roads. For example, when a left directional light flickers or a steering wheel is rotated to the left, a virtual road for the left road, corresponding traffic information, and corresponding surrounding information are added to a road image of the front of the vehicle and displayed.

In addition, the controller 380 may show only a virtual road to which the vehicle belongs from among a plurality of virtual roads, and provide traffic information and surrounding information regarding this virtual road.

In addition, the controller 380 may change a method for reporting traffic information and surrounding information depending on information provided by the vehicle operation information receiver 330. For example, when the vehicle's braking system engages to slow or stop the vehicle, an indicator representing a distance up to another vehicle directly in front or in the path of the present vehicle where the driver and terminal are positioned is displayed in relief.

As described above, the controller 380 outputs data regarding a user interface via the output unit 350 of the terminal for a vehicle. The controller 380 is not limited thereto, but may transmit data regarding the user interface to a vehicle that communicates with the terminal via a wired line or wirelessly, and the vehicle may output the user interface via a relevant output means (for example, a display), which can include audio, visual, or a combination thereof.

The controller 380 of the terminal for a vehicle according to an exemplary embodiment of the present invention may preferably include the image receiver 310, a sensor receiver 320, a vehicle information receiver 330, a traffic information receiver 340, and an eyeball tracking unit 370.

Based on this construction, a user interface method of the controller 380 according to an exemplary embodiment of the present invention is described with further reference to the accompanying drawings.

Figure 4:
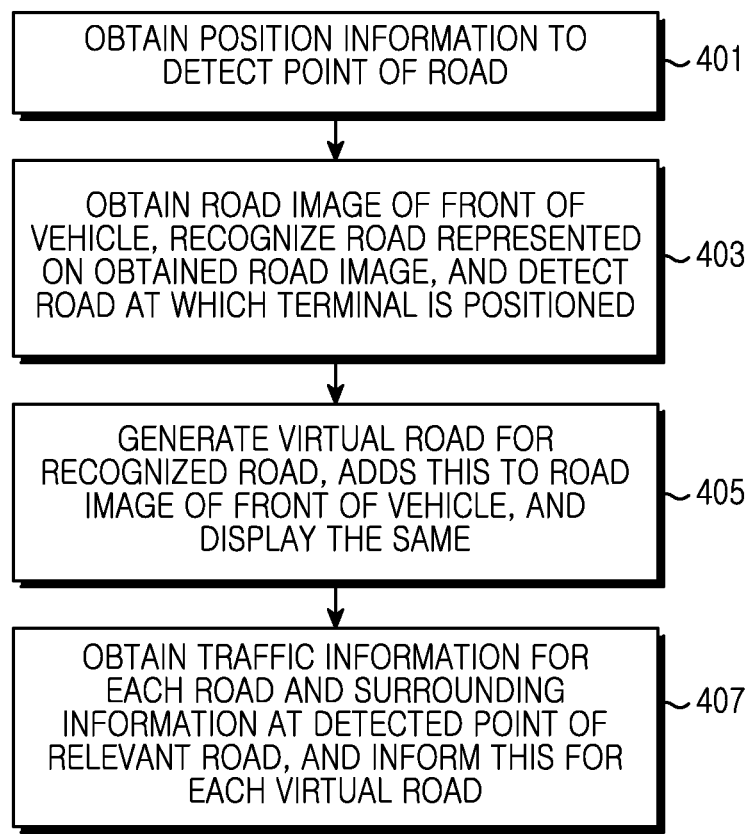
FIG. 4 is a flowchart illustrating exemplary operation of a user interface procedure for a terminal for a vehicle according to an exemplary embodiment of the present invention.

FIG. 4 is a flowchart illustrating exemplary operation of a user interface procedure for a terminal for a vehicle according to an exemplary embodiment of the present invention.

Referring now to FIG. 4, at (S401) the controller 380 obtains position information to detect a point of a road corresponding to the position information.

At (S403), the controller 380 obtains a road image of the area in front of the vehicle, recognizes a road represented on the obtained road image, and detects the road where the terminal is positioned. The recognition may optionally include the type of road and the name of the road.

At (S405), the controller 380 generates a virtual image of the road corresponding to the recognized road from (S403), adds the virtual road to the road image of the front of the vehicle, and displays the same image.

At (S407), the controller 380 obtains traffic information for each road and surrounding information at the detected point of the road, and informs the information for each virtual road.

Figure 5:
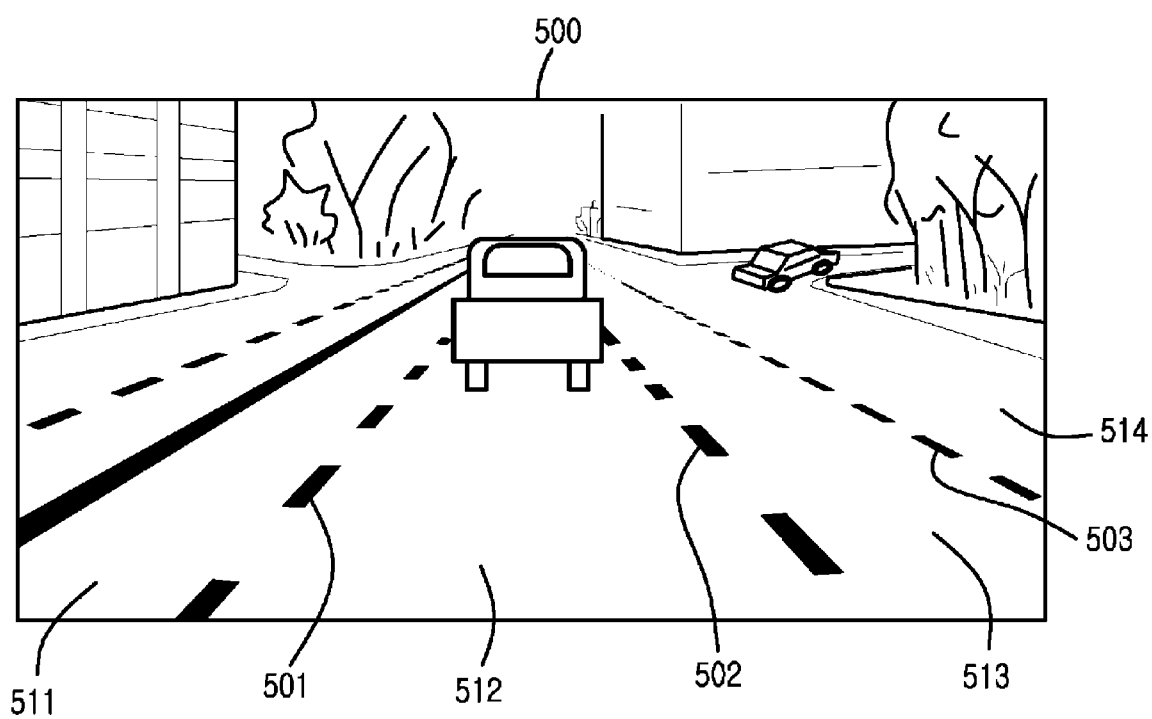
FIG. 5 is a screen showing a road image of a front side of a vehicle in a terminal for a vehicle according to an exemplary embodiment of the present invention.

FIG. 5 is a screen showing a road image of a front side of a vehicle in a terminal for a vehicle according to an exemplary embodiment of the present invention. This image is substantially similar to what a driver might see looking through the windshield.

Referring now to FIG. 5, a road image 500 of the front of a different vehicle according to an exemplary embodiment of the present invention is captured by viewing a driving direction using a camera in at least one of a vehicle terminal or a camera of a vehicle. The road image 500 shows a surrounding vehicle, building, traffic lanes 511, 512, 513, and 514, and traffic lanes 501 and 502 discriminating respective roads. A vehicle and a terminal for a vehicle are positioned at a road 512 on the center of the screen in the lane adjust the very-most left lane, when one considers the solid line to be a painted or physical division for traffic that moves in opposite directions.

Figure 6:
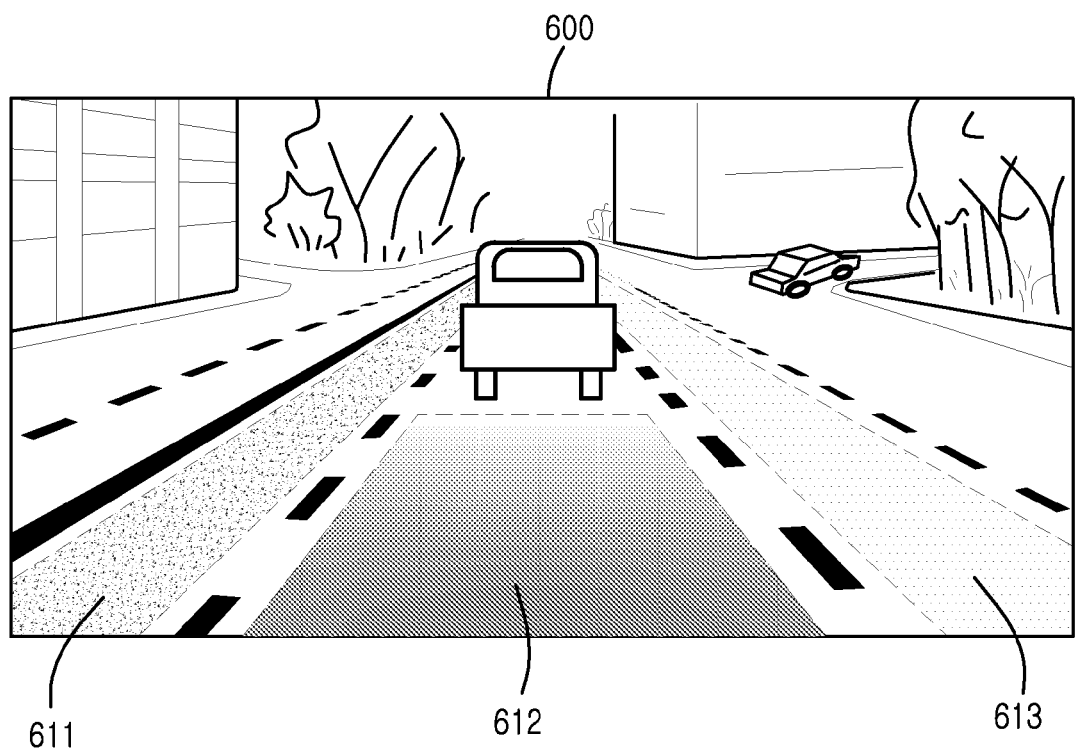
FIG. 6 is a screen showing a user interface in a terminal for a vehicle according to an exemplary embodiment of the present invention.

FIG. 6 is a screen showing a user interface in a terminal for a vehicle according to an exemplary embodiment of the present invention.

Referring now to FIG. 6, a user interface according to an exemplary embodiment of the present invention adds a virtual road corresponding to a recognized road onto a road image 600 in a driving direction and displays the same. More particularly, each lane of the virtual road is designated and displayed by a color representing a degree of the speed of driving depending on traffic information and surrounding information. For example, the driving speed can be divided into high, medium, and low. A color corresponding to each degree may be designated. For example, a virtual lane 611 of the road whose driving speed is fast may be represented by a red color, a virtual lane 612 whose driving speed is low may be represented by a blue color, and a virtual lane 613 whose degree of swift driving is medium may be represented by a yellow color.

Figure 7:
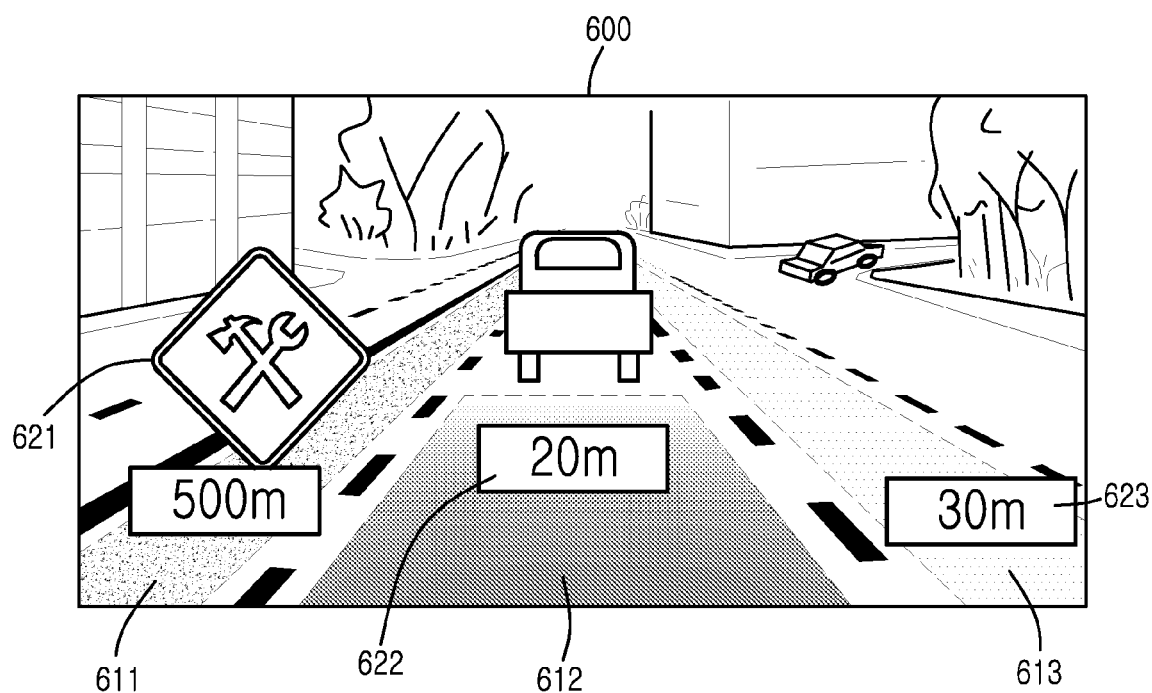
FIG. 7 is a screen showing a user interface in a terminal for a vehicle according to an exemplary embodiment of the present invention.

FIG. 7 is a screen showing a user interface in a terminal for a vehicle according to an exemplary embodiment of the present invention. As described with reference to FIG. 6, the user interface according to an exemplary embodiment of the present invention adds a virtual lane corresponding to a recognized road onto the road image 600 of the driving direction, and displays the same. More particularly, each virtual lane is designated and displayed using a color representing a degree of speed depending on traffic information and surrounding information. In FIG. 7, the color may signify slow speed as there is a construction sign, indicating that lane has construction further ahead (500 m away).

Furthermore, a user interface according to an exemplary embodiment of the present invention adds an indicator 621 depending on traffic information for each lane of the road and indicators 622 and 623 depending on surrounding information for each lane to a virtual road, and displays the same.

Figure 8:
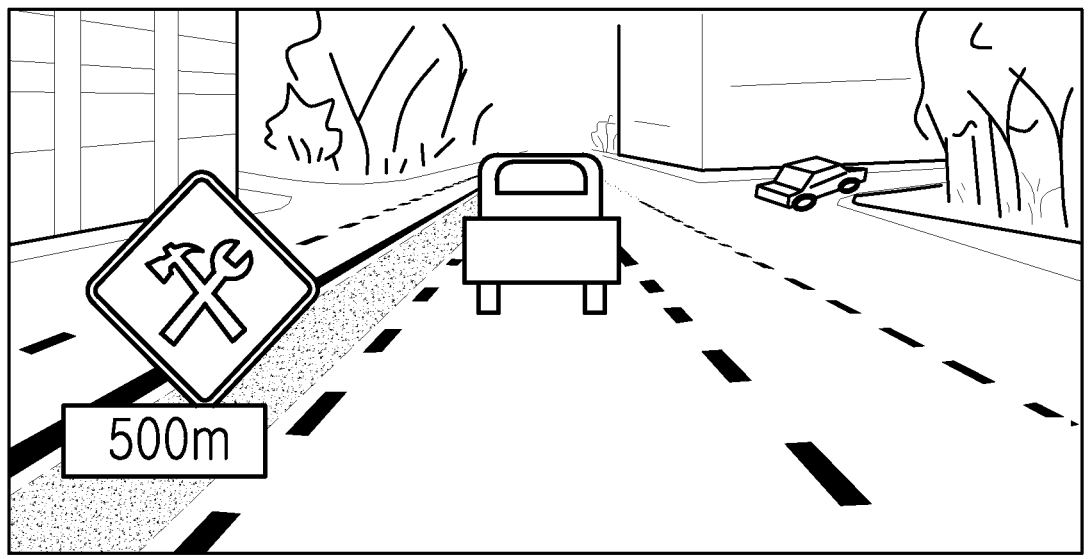
FIGS. 8 and 9 are screens showing a user interface in a terminal for a vehicle according to an exemplary embodiment of the present invention.
Figure 9:
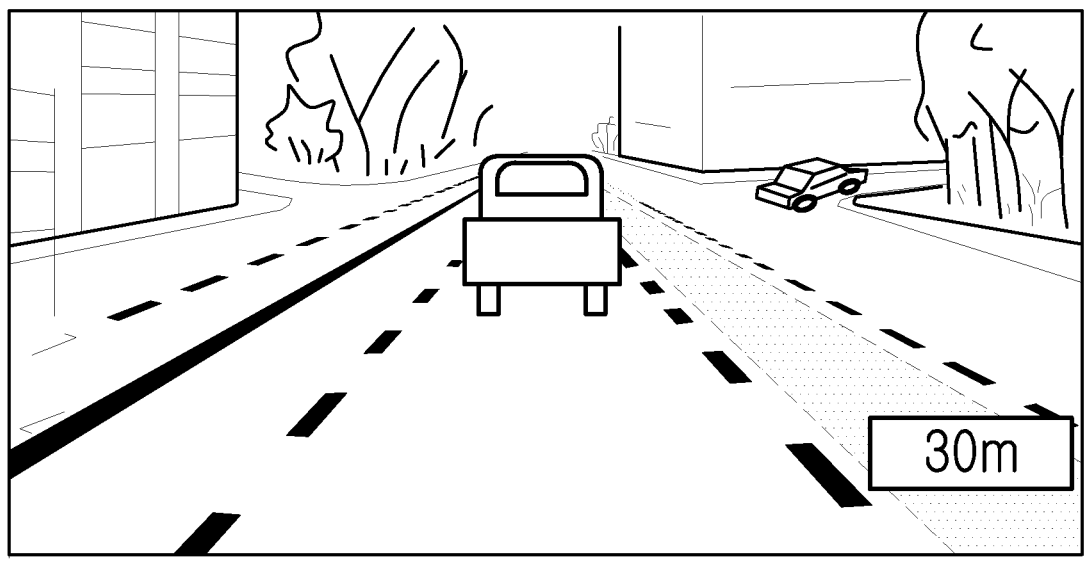

FIGS. 8 and 9 are screens showing a user interface in a terminal for a vehicle according to an exemplary embodiment of the present invention. The user interface displays the construction described in FIGS. 6 and 7. However, in the case where vehicle operation information, more particularly, a relevant directional light flickers or eyes are tracked to a relevant road of a road image, only an indicator of a relevant virtual road and corresponding traffic information and an indicator of surrounding information are displayed. For example, when a left directional light of a vehicle flickers or a user keeps eyes on a left road of a road image, indicators of a virtual road corresponding to the left road, corresponding traffic information, and surrounding information are displayed.

Figure 10A:
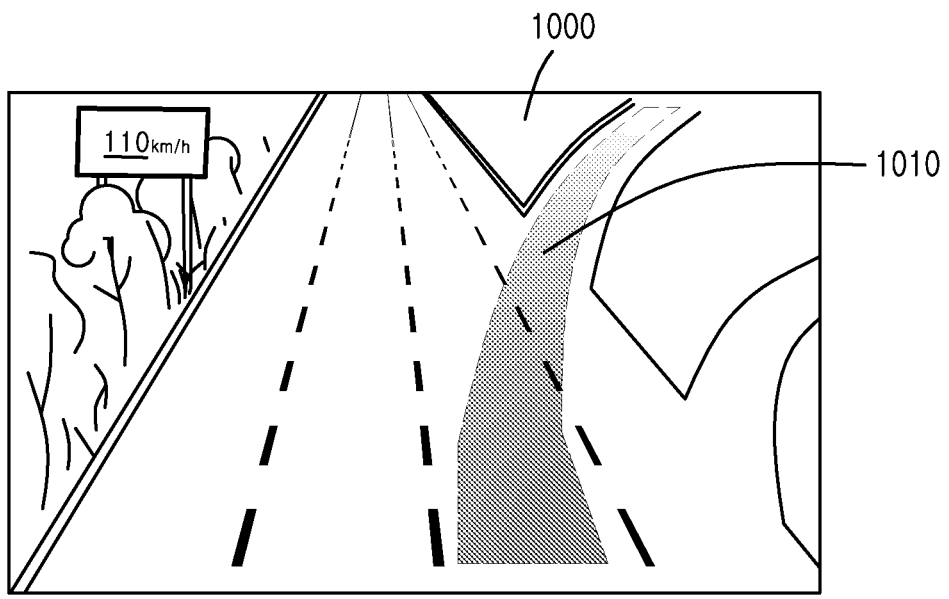
FIGS. 10A and B are screens showing a user interface in a terminal for a vehicle according to an exemplary embodiment of the present invention.

FIGS. 10A and B are screens showing a user interface in a terminal for a vehicle according to an exemplary embodiment of the present invention.

Figure 10B:
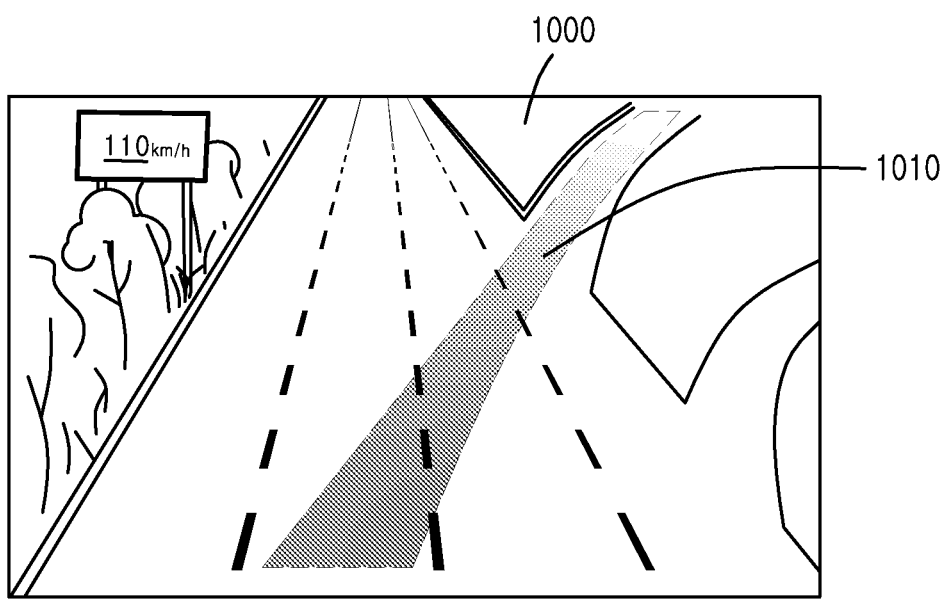

As illustrated in FIGS. 10A and 10B, when a path is designated, the path is displayed (1010) on the road image 1000 of the front of the vehicle shown in real-time. However, as is known from a difference between FIG. 10A and FIG. 10B, the path is shown based on a lane where the vehicle is currently positioned and if one were to follow the exact path shown in either the lane in FIG. 10A or 10B, would receive a traffic infraction. The present invention would in lieu of or in association with GPS or other types of navigation, direct the driver to move to the rightmost lane at a safe and legal distance prior to exiting the road to follow path 1010.

Consequently, the present invention is helpful to a user's safe driving by providing a virtual road with lanes based on the actual road being traveled, and includes traffic information for each lane and surrounding information to an image showing an actual road.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A user interface method for a terminal for a vehicle, the method comprising:
    obtaining by a controller position information to detect a point of a road on which a vehicle having the terminal arranged therein is situated;
    obtaining by the controller a road image of a driving direction of said vehicle having the terminal arranged therein, recognizing a type of road represented on the obtained road image, and detecting the point of a road;
    generating by the controller a virtual road including lane markings identifying lanes as captured by the road image regarding the recognized road, and adding the generated virtual road including lanes to the road image of the driving direction displayed by a display; and
    obtaining by the controller traffic information for each lane of the road, respectively, and surrounding information at the detected point of the road, and outputting the obtained information for each lane of the virtual road by the display.

2. The method of claim 1, wherein the obtaining of the traffic information for each lane of the road and surrounding information at the detected point of said vehicle on the road, and the outputting of the obtained information for each virtual road comprises:
    determining, by a processor, a degree of driving speed of each lane from the traffic information and surrounding, information; and
    displaying the virtual road and including indicators about the determined degree of driving speed in each lane.

3. The method of claim 2, wherein the displaying of the virtual road including indicators of the determined degree of driving speed in each lane comprises:
    when the degree of driving speed is indicated as high, medium or low relatively as compared to a predetermined driving speed or a driving speed of lanes adjacent to a particular lane in which said vehicle is traveling, and displaying each lane of the virtual road using visually distinctive characteristics.

4. The method of claim 3, wherein the visually distinctive characteristics include distinguishing colors.

5. The method of claim 1, wherein the obtaining of the traffic information for each lane of the road and surrounding information at the detected point of the road, and the outputting the obtained information for each virtual road comprises:
    obtaining the traffic information for each lane of the road with respect to the detected point of said vehicle in the road via at least one network; and
    communicating with said vehicle via a wired line or wirelessly, and obtaining the surrounding information for each lane of the road from said vehicle.

6. The method of claim 5, wherein the traffic information comprises at least one of a traffic circumstance for each section of road in front of said vehicle, wherein the traffic circumstance includes an accident, or a road construction.

7. The method of claim 5, wherein the surrounding information comprises at least one of a predetermined distance from a front of said vehicle, a predetermined distance from a rear of said vehicle, and a lateral distance from a said vehicle.

8. The method of claim 1, further comprising the user interface communicating with a communication unit of said vehicle, obtaining vehicle operation information from the vehicle, and displaying at least one of the virtual road, the traffic information, and the surrounding information depending on the obtained vehicle operation information.

9. The method of claim 8, wherein the vehicle operation information comprises sensing one of flickering of a directional light and sensing a steering operation of a steering wheel.

10. The method of claim 8, wherein when communicating with the vehicle, obtaining vehicle operation information from the vehicle, and displaying at least one of the virtual road, the traffic information, and the surrounding information depending on the obtained vehicle operation information comprises:
 when a left directional light of the vehicle flickers, or it is detected that a steering wheel is steered in a left direction, displaying a virtual road or traffic information or surrounding information for a leftmost lane of the road, and when a right directional light of the vehicle flickers, or it is detected that a steering wheel is steered in a right direction, displaying a virtual road or traffic information or surrounding information for a rightmost lane of the road.

11. The method of claim 1, wherein obtaining traffic information for each lane of the road and surrounding information at the detected point of the road where said vehicle is situated, and outputting the obtained information for each virtual lane of the road comprises:
 outputting a virtual road corresponding to a lane of the road to which the terminal within said vehicle currently belongs, corresponding traffic information and surrounding information.

12. The method of claim 1, wherein obtaining traffic information for each lane of the road and surrounding information at the detected point of the road where said vehicle is situated, and outputting the obtained information for each virtual lane of the road comprises:
 tracking a user's eyes, and displaying at least one of the virtual lane of the road corresponding to a road to which the tracked eyes are directed in the road image, the corresponding traffic information, and the surrounding information.

13. The method of claim 1, wherein obtaining traffic information for each lane of the road and surrounding information at the detected point of the road where said vehicle is situated, and outputting the obtained information for each virtual lane of the road comprises:
 loading indicators for the traffic information and surrounding information to add the indicators to the display of the virtual road and display the same.

14. The method of claim 1, further comprising:
 communicating with a communicating unit of said vehicle via a wired line or wirelessly, and transmitting at least one of the road image of the driving direction, the virtual road, and the traffic information to said vehicle.

15. An apparatus for a terminal for a vehicle, the apparatus comprising:
 an output unit on a front of the terminal comprising at least a display for outputting image data and voice data;
 a position information receiver for obtaining position information of a particular vehicle in which said terminal is arranged;
 a rear camera on a back of the terminal for capturing a road image of a driving direction when the terminal is positioned in the vehicle so that the front of the terminal faces a steering control;
 a traffic information receiver for receiving traffic information for each lane of road via at least one network;
 a vehicle sensor receiver for communicating with said vehicle in which the terminal is arranged via a wired line or wirelessly, and obtaining surrounding information for each road from the vehicle;
 a non-transitory storage for storing a predetermined program for controlling an overall operation, and various data input/output when a control operation is performed; and
 a controller for performing an overall control of the terminal,
 wherein the controller recognizes a road from the road image of the driving direction, detects a particular lane of the road in which the terminal is positioned, generates a virtual road image for the recognized road and adds generated virtual lanes to the road image of the driving direction and displays the same, detects a point of a road from the position information, and displays traffic information and surrounding information for each lane of the road at the detected point of the road in which said vehicle is situated.

16. The apparatus of claim 15, wherein the controller determines a driving speed for each lane of the road from the traffic information and surrounding information, and displays each virtual lane of the road displayed with visually distinguishment depending on the determined driving speed of other vehicles lanes of the road.

17. The apparatus of claim 16, wherein the controller categorizes driving speed into high, medium, and low, said driving speed relative to a predetermined speed or by comparing each of the lanes of the road to each other, and visually distinguishes the driving speed of each of the lanes of the road.

18. The apparatus of claim 17, wherein when the driving speed is high, displays the relevant virtual road using a first color or shade of color, when the degree of swiftness in driving is medium, displays the relevant virtual road using a second or shade of color, and when the degree of swiftness in driving is low, displays the relevant virtual road using a third color or shade of color.

19. The apparatus of claim 15, wherein the traffic information comprises at least one of a traffic circumstance for each section of upcoming road within a predetermined distance, an accident, and a construction.

20. The apparatus of claim 15, wherein the surrounding information comprises at least one of a distance from a front of said vehicle, a distance from a rear of said vehicle, and a lateral distance from said vehicle.

21. The apparatus of claim 15, further comprising a vehicle operation information receiver for communicating with said vehicle via a wired line or wirelessly, and obtaining vehicle operation information from said vehicle.

22. The apparatus of claim 21, wherein the controller controls display of at least one of the virtual road, the traffic information, and the surrounding information depending on the vehicle operation information.

23. The apparatus of claim 21, wherein the vehicle operation information comprises at least one of flickering of a directional light and a steering operation of a steering wheel.

24. The apparatus of claim 23, wherein when a left directional light of the vehicle flickers, or it is detected that a steering wheel is steered in a leftward direction, the controller displays a virtual road or traffic information or surrounding information for a leftward lane road relative to said vehicle, and when a right directional light of the vehicle flickers, or it is detected that a steering wheel is steered in a right direction, the controller displays a virtual road or traffic information or surrounding information for a rightward lane of the road relative to said vehicle.

25. The apparatus of claim 15, wherein the controller controls output of display of a virtual road corresponding to the road to which the terminal currently belongs, corresponding traffic information and surrounding information.

26. The apparatus of claim 15, further comprising a front camera on a front of the terminal for detecting a user's eyeballs and an eyeball tracking unit for tracking the user's eyes while viewing the road image of the driving direction via the front camera.

27. The apparatus of claim 26, wherein the controller controls output of display of at least one of the virtual road corresponding to a road to which the tracked eyes are directed in the road image, the corresponding traffic information, and the surrounding information.

28. The apparatus of claim 15, wherein the controller controls the display of load indicators for the traffic information and surrounding information and adds the indicators to a virtual road displayed by the display.

\* \* \* \* \*

UNITED STATES PATENT AND TRADEMARK OFFICE
CERTIFICATE OF CORRECTION

| | | |
|---|---|---|
| PATENT NO. | : 8,626,427 B2 | |
| APPLICATION NO. | : 13/422235 | |
| DATED | : January 7, 2014 | |
| INVENTOR(S) | : Hyung-Kil Park et al. | |

It is certified that error appears in the above-identified patent and that said Letters Patent is hereby corrected as shown below:

In the Claims

Column 10, Claim 2, Lines 41-42 should read as follows:
--...information and surrounding information...--

Signed and Sealed this
Eighteenth Day of March, 2014

Michelle K. Lee
*Deputy Director of the United States Patent and Trademark Office*